US009261159B2

(12) United States Patent
Thein et al.

(10) Patent No.: US 9,261,159 B2
(45) Date of Patent: Feb. 16, 2016

(54) FIRE PROTECTION FOR MONO-TUBE DAMPER

(71) Applicants: Thomas Thein, Sennfeld (DE); Stefan Liehmann, Schweinfurt (DE); Ingo Schau, Erlangen (DE); Michael Heinisch, Hassfurt (DE)

(72) Inventors: Thomas Thein, Sennfeld (DE); Stefan Liehmann, Schweinfurt (DE); Ingo Schau, Erlangen (DE); Michael Heinisch, Hassfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 56 days.

(21) Appl. No.: 14/102,777

(22) Filed: Dec. 11, 2013

(65) Prior Publication Data

US 2015/0159723 A1 Jun. 11, 2015

(51) Int. Cl.
*F16F 9/36* (2006.01)
*F16F 9/32* (2006.01)

(52) U.S. Cl.
CPC ....... *F16F 9/3242* (2013.01); *F16F 2230/0023* (2013.01)

(58) Field of Classification Search
CPC ... F16F 9/3235; F16F 9/3242; F16F 2230/24; F16F 9/3271; F16F 9/36; F16F 9/362; F16F 9/366; F16F 9/52; F16F 9/003
USPC ........................................ 188/322.16, 322.17
See application file for complete search history.

(56) References Cited

U.S. PATENT DOCUMENTS

| 3,287,008 | A |   | 11/1966 | Fernandez |
|-----------|---|---|---------|-----------|
| 4,988,081 | A |   | 1/1991  | Dohrmann |
| 5,454,455 | A |   | 10/1995 | Kundmuller |
| 6,105,739 | A | * | 8/2000  | Deppert ................... 188/322.17 |
| 6,840,153 | B2 |  | 1/2005  | Wirth |
| 2004/0046144 | A1 | * | 3/2004 | Yanagiguchi et al. ...... 251/335.1 |
| 2004/0079225 | A1 | * | 4/2004 | Reiser ......................... 92/165 R |
| 2005/0011711 | A1 | * | 1/2005 | Schilz .......................... 188/276 |
| 2008/0179149 | A1 | * | 7/2008 | Strong ..................... 188/322.17 |
| 2009/0057081 | A1 | * | 3/2009 | Moravy ....................... 188/379 |
| 2009/0205913 | A1 | * | 8/2009 | Hart ............................ 188/267.2 |

FOREIGN PATENT DOCUMENTS

DE 3901449 2/1990

* cited by examiner

*Primary Examiner* — Nicholas J Lane
(74) *Attorney, Agent, or Firm* — Cozen O'Connor

(57) ABSTRACT

A piston-cylinder unit for a mono-tube damper, includes: a cylinder having an inner wall and a closure fixed axially with respect to the cylinder by positive engagement with one or more impressions of the inner wall, the closure having a plug sealed with respect to the inner wall, the plug having a reinforced portion and being axially moveable with respect to the cylinder when a temperature threshold is exceeded. Axial movement caused by the temperature threshold being exceeded causes deformation of the plug with respect to the cylinder so as to: (i) form a channel between the plug and the inner wall of the cylinder, through which pressure, caused by the increased temperature, can escape the piston-cylinder unit, and (ii) permit axial movement of the closure only to a point at which the reinforced portion of the plug comes into contact with the one or more impressions in the cylinder.

17 Claims, 4 Drawing Sheets

FIRE PROTECTION FOR MONO-TUBE DAMPER

BACKGROUND OF THE INVENTION

1. Field of the Invention

The invention is directed to a cylinder piston device and more particularly to a mono-tube vibration damper, including a cylinder having an inner wall bounding a work space filled with a working medium, such as hydraulic fluid. A closure is fixed axially with respect to the cylinder by position engagement with the cylinder. The closure bounds the work space and is sealed with respect to the inner wall by a circumferential seal, but is axially movable with respect to the cylinder when a temperature threshold is exceeded.

2. Description of the Related Art

It is a characteristic of a mono-tube vibration damper that it may be subject to extreme temperature loading, for example, in case of an automobile accident in which the mono-tube vibration damper of the motor vehicle is exposed to fire. In such a situation, the work medium found in the piston device, typically a damping fluid, undergoes a very great expansion, so that a pushing-out force acting on the piston rod and a closure at an axial end of the piston rod overloads the fastening of the closure within the cylinder, the fastening being designed for normal operation. In a worst case scenario, the piston, together with the piston, may be explosively pushed out of the cylinder, due to the pressure level within the mono-tube vibration damper. This can lead to devastating consequences, including injuries to passengers, for example, when the mono-tube damping device is used as a shock absorber in a passenger automobile.

Solutions have been suggested to ameliorate this scenario. These solutions have in common that they attempt to ensure a controlled drop in pressure, rather than an explosion. Some known solutions provide for a deliberately weakened area in the seal to allow for escape of pressurized fluid under extreme pressure situations.

In DE3901449, a solution is proposed in which the seal of the tube is formed so as to have an element that melts upon occurrence of high temperatures, to relieve pressure in the interior. This solution works by providing a deliberately meltable portion of the seal.

U.S. Pat. No. 5,454,455 discloses that at least one bead provides a stop surface for the piston rod-piston unit to prevent its expulsion. However, this solution requires a specially adapted piston and, in some cases, may lead to a loss of useful stroke because the bead is formed within the travel path of the piston.

U.S. Pat. No. 6,840,153, commonly assigned with the present application, discloses a piston-cylinder unit in which a sealing closure is fixed axially by a positive engagement with the cylinder up to a temperature threshold. The closure can carry out an axial movement for relieving pressure above the temperature threshold, in which the relief of the pressure is achieved by providing a cutting device as a tongue-like projection from the wall of the cylinder. Upon axial movement, the cutting device performs a cutting action that cancels the sealing function of the seal. However, this solution requires providing additional structure, i.e., the cutting device, whose only purpose is providing the channel in the high temperature situation.

The danger of uncontrolled explosive axial movement of the piston seal has also complicated and increased the costs of transporting mono-tube vibration dampers. In particular, in some jurisdictions, particularly in the United States, mono-tube vibration dampers are treated, for purposes of transportation, in the same manner as explosives, limiting access to certain roads, bridges and tunnels, increasing the cost of transporting these products. For example, the characteristics discussed above have meant that only certified transportation companies are permitted to transport mono-tube dampers, and only designated roads and border crossings must be used.

SUMMARY OF THE INVENTION

Against this background, it is the object of the invention to provide a mono-tube damper design that provides for a reliable relief of pressure that will allow mono-tube dampers having the design according to the present invention to be transported by ordinary transportation companies on public roads and border crossings, without resorting to localized weakening of the material of the seal, special cutting structures, or relying upon melting of elastomers to provide relief from the built up pressure.

According to one aspect of the present invention, this object is met by a piston-cylinder unit for a mono-tube damper, that includes: a cylinder having an inner wall bounding a work space filled with a working medium, the inner wall having one or more impressions formed therein in a radially inward direction; a closure fixed axially with respect to the cylinder by positive engagement with the one or more impressions, the closure bounding the work space and having a plug sealed with respect to the inner wall by a circumferential seal seated in a sealing groove formed in the plug, the plug having a reinforced portion and the closure being axially moveable with respect to the cylinder when a temperature threshold is exceeded; and a piston rod disposed axially within the cylinder and extending through the closure. The plug is configured so that axial movement caused by the temperature threshold being exceeded causes deformation of the plug with respect to the cylinder so as to: (i) form a channel between the plug and the inner wall of the cylinder, through which pressure, caused by the increased temperature, can escape the piston-cylinder unit, and (ii) permit axial movement of the closure only to a point at which the reinforced portion of the plug comes into contact with the one or more impressions in the cylinder.

Preferred further developments of the invention are indicated in the following description, in which exemplary embodiments of the invention are described more fully with reference to the drawings without limiting to these embodiment examples.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
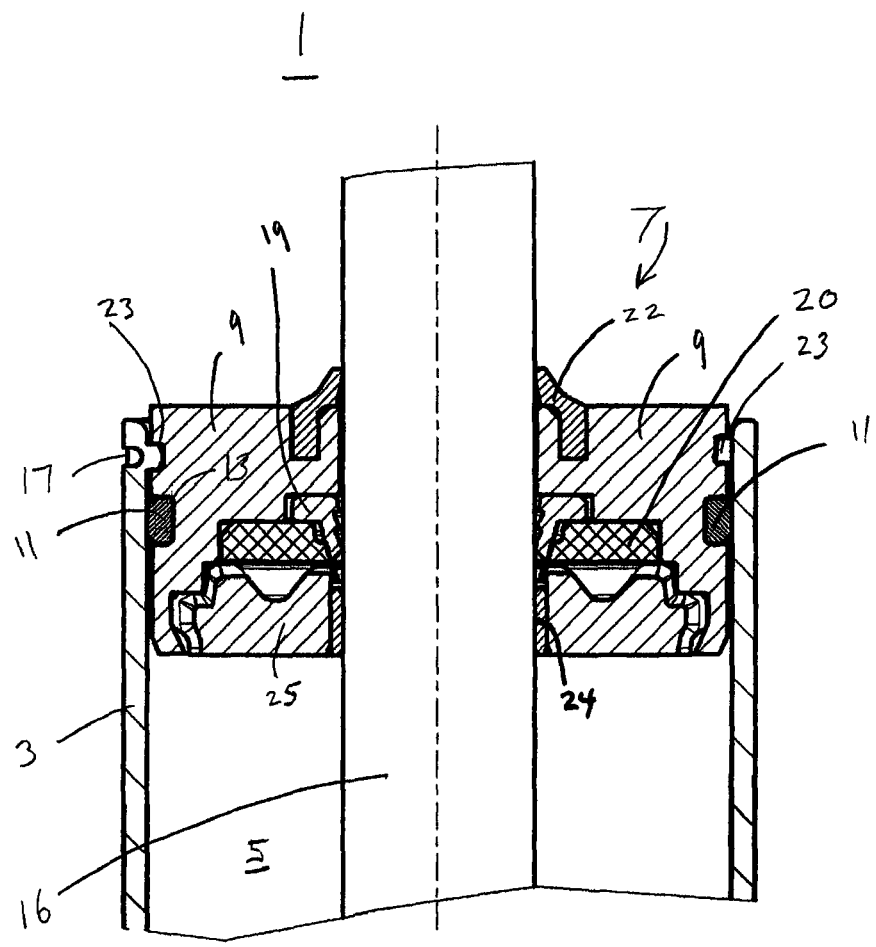
FIG. 1 is a schematic illustration of a portion of a piston-cylinder unit of a mono-tube damper in the area of closure of the unit in a normal operational condition.

FIG. 1 shows a section from a piston-cylinder unit 1 of a mono-tube damper, i.e., a vibration damper constructed according to the single-tube principle. In FIG. 1, the piston-cylinder unit 1 is in a normal operating state, i.e., in a condition of normal operational temperature. A cylinder (tube) 3, preferably formed of steel, or similarly strong material, defines a work space 5 that is filled with a work medium, such as hydraulic fluid, and which is limited at the end by a closure 7 that includes a plug 9. In a preferred embodiment, the plug 9 is formed from aluminum, or alloys thereof, and is radially engaged by its radially outer circumferential face with the circumferential radially inner face of the cylinder 3.

An annular seal (O-ring) 11 is disposed inside a groove 13 formed in the plug 9. The O-ring 11 is under radial compression between the cylinder 3 and the tube 9. The O-ring 11 closes an annular gap between the inner wall of the cylinder 3 and the outer surface of the plug 9. An axially movable piston rod 16 is enclosed by an annular piston rod sealing member 19 which prevents leakage at the inner diameter of the closure. An annular rubber ring 20 is located below and axially outward of the piston rod sealing member 19.

A sealing element 22 surrounds the portion of the piston rod 16 that exits, axially upwardly, the plug 9, preventing dirt from entering the gap between the inner surfaces of the plug 9 and the outer surface of the piston rod 16.

The plug 9 is held in its predetermined position by a positive engagement with the cylinder in the range of normal operating temperature. For this purpose, the cylinder 3 has a quantity of beads 17, for example, 3, 6 or 12 beads, which extend and are distributed in the circumferential direction and engage in circumferentially extending corresponding indentations 23 of the plug 9. The beads 17 are preferably formed by punching inwardly into the cylinder 3 with the closure 7 in place, so that the punching that forms the beads 17 also forms the associated circumferentially distributed indentations 23 in the plug 9. Alternatively, a radially inward directed annular impression or groove 23 can be pre-formed in the plug 9 prior to assembly of the closure 7 and the cylinder 3. In this variation, the beads 17 reside in the pre-formed groove 23 at various points around the periphery of the plug 9. The engagement of the beads 17 and the associated indentations (or groove) 23 acts to fasten the plug 9 with respect to the cylinder tube 3.

A guide sleeve 24 surrounds the outer circumferential portion of the piston rod 16. The guide sleeve 24 preferably comprises Polytetrafluoroethylene (PTFE), to reduce friction with the piston rod 16.

An annular reinforcing element 25 is disposed inwardly, in a radial direction, of a lower portion of the plug 9. Preferably, the annular reinforcing element 25 is formed of steel, and in any event, of a material that is harder and more temperature resistant than the material forming the plug 9. By more temperature resistant is meant less susceptible to softening/ductility in response to higher temperatures. Preferably, in the case of annular reinforcing element 25, the steel has undergone a known sintering process to increase its hardness appropriately.

Preferably, the lower portion of the plug 9, in particular the portion of the plug 9 below the annular seal (O-ring) 11, is reinforced in comparison with the upper portion of the plug 9. This can be achieved, for example, by hardening the reinforced portion of the plug 9 by subjecting this portion of the plug 9 to the known hardcoat anodization or anodizing process, in which the aluminum of the lower portion of the plug 9 is dipped into $H_2SO_4$ and connected to an anode so as to form a hard layer of aluminum oxide in a desired area, in this case, the lower area. Other methods of reinforcement can also be utilized, and will be discussed below. The reinforcement of the lower portion of plug 9, in whatever manner, preferably makes the lower portion of the plug more resistant to deformation in general, and particularly deformation caused by heat and/or pressure.

Figure 2:
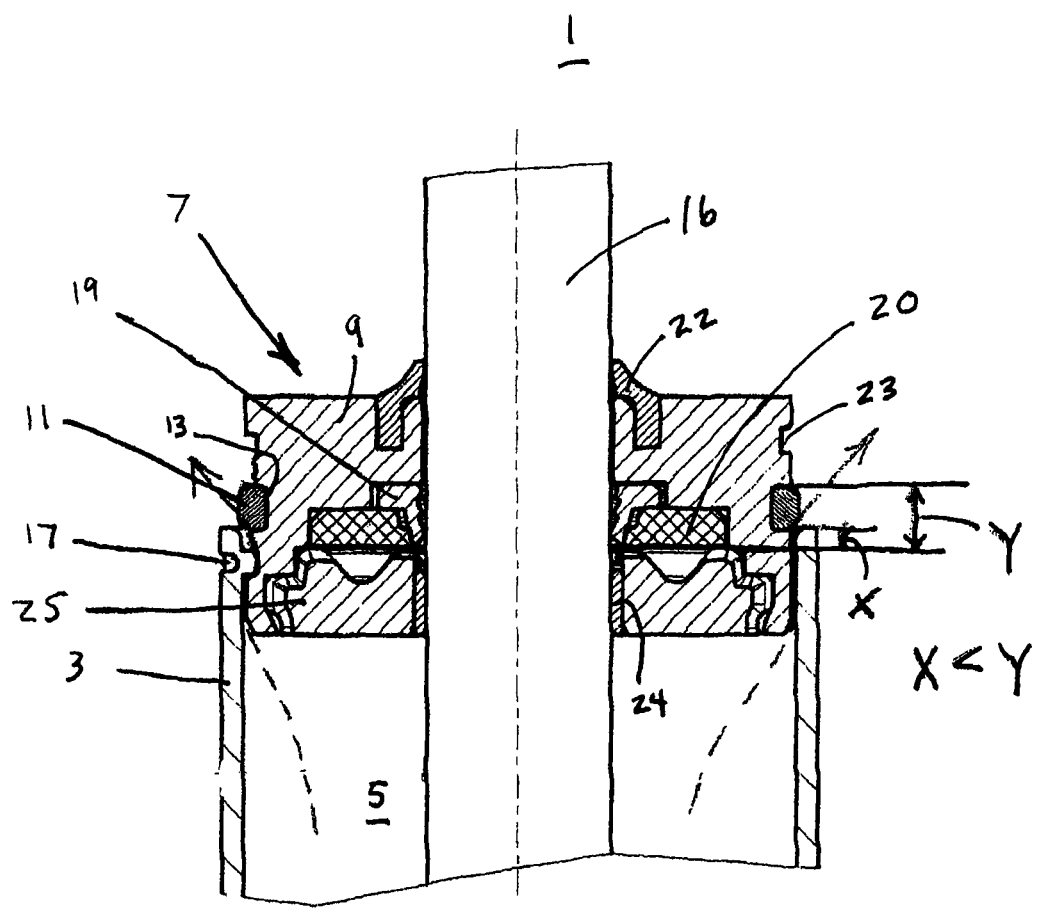
FIG. 2 is a schematic illustration of a portion of the piston-cylinder unit of the mono-tube damper in the area of closure of the unit after a temperature limit has been exceeded.

In case of fire when the piston-cylinder unit is mounted in a motor vehicle, for example, if the motor vehicle catches fire in an accident or during transportation of the mono-tube piston-cylinder unit, the temperature at the cylinder rises above a normal operating temperature threshold determined by the construction of the piston-cylinder unit. The work medium 5 is likewise heated and, in so doing, necessarily expands. A pressure force exceeding the retaining force of the beads 17 in the indentations 23 (or circumferentially extending groove 23) acts at the underside of the closure 7, so that the positive engagement between the closure 7 and the cylinder 3 is canceled, particularly in a closure 7 whose material, such as the plug 9, has a thermal resistance lower than that of the cylinder 3. This lower thermal resistance will cause the material of the plug 9 to exhibit increased ductility in response to increasing temperature. In this scenario, the beads 17, which are formed from the steel of the cylinder 3, are relatively unaffected by the increased temperature, while the material of the plug 9, such as aluminum, can be more easily deformed due to the increased ductility. After this loading point has been reached, the closure 7 carries out an axial movement. FIG. 2 shows the result of this axial movement when using the embodiment shown in FIG. 1.

FIG. 2 illustrates the top of the piston-cylinder unit 1 after it has been subjected to the force in the axial direction caused, for example, by overload, or by a fire producing a high temperature, typically about 300° C. As can be seen in FIG. 2, the piston-cylinder unit 1 is configured such that, in response to such an axial force, the plug 9 is displaced axially at least far enough so that the outer annular O-ring 11 is no longer in operative connection with the original sealing surface, and, the annular O-ring 11 has been displaced over the beads 17. This displacement causes a mechanical weakening of the seal, having the effect of canceling the sealing effect between the plug 9 and the cylinder (tube) 3, such that the pressure can escape, through a channel to be discussed in more detail below, preventing ejection of the plug 9.

In order to facilitate this limited displacement, as opposed to a complete ejection of the closure 7, in accordance with an aspect of the present invention, the area of the plug 9 below the groove 13 for the annular seal (O-ring) 11 is reinforced, as discussed above, so as to exhibit less ductility in response to temperature.

In particular, the reinforcement of the lower portion of the plug 9, relative to the upper portion of the plug, results in a controlled drop of pressure, rather than an explosive ejection of the closure 7. In the event of fire, the aluminum component, i.e., plug 9, softens, with a top portion of the plug 9 (the non-reinforced portion) being deformed to a greater extent than the reinforced lower portion of plug 9. The plug 9 moves upwardly axially to a point shown in FIG. 2, i.e., only to the point at which the beads 17 contact the upper part of the reinforced portion of the plug 9 having a higher resistance to temperature, i.e., the region that is reinforced so as to be less susceptible to deformation in the face of high temperature, at which point the axial movement stops.

As shown in FIG. 2, after the occurrence of the axial upward force, the plug 9 has been displaced upwardly to the point where the sealing annular O-ring 11 is now above the beads 17. As shown in the figure, a top edge of the reinforced portion of the plug 9 abuts the beads 17, preventing further axial movement.

In this condition, the positioning of the annular O-ring 11 above the beads 17 advantageously creates a channel, indicated by the dashed arrow, between the plug 9 and the cylinder wall 3, which allows pressurized work medium (hydraulic fluid) to escape axially and outwardly from the piston-cylinder unit 1, relieving the upward pressure on the plug 9 to such an extent that the plug 9 is not ejected from the tube.

The annular reinforcing element 25, being formed, in a preferred embodiment, of steel, a material that is harder and more temperature resistant than the material, e.g., aluminum, forming the plug 9, prevents the lower portion of the plug 9 from deforming too much inwardly in the radial direction. The combination of the reinforced nature of the lower portion of plug 9 and the hardness of the material forming the annular reinforcing element 25 ensures that an outer and upper portion of the reinforced portion of the plug 9 is stopped by the beads 17, while still permitting the channel, shown by the dashed arrows, to be formed, to allow for the controlled escape of pressurized hydraulic fluid 5.

To ensure that the channel for controlled escape of pressure will be formed in accordance with the present invention, the distance X of the upper edge of the reinforcing element 25 to the upper edge of the cylinder wall 3 is highly preferably less than the distance Y between the upper edge of reinforcing element 25 and the upper edge of the O-ring groove 13, so that the O-ring 11 loses its sealing effect.

Figure 3:
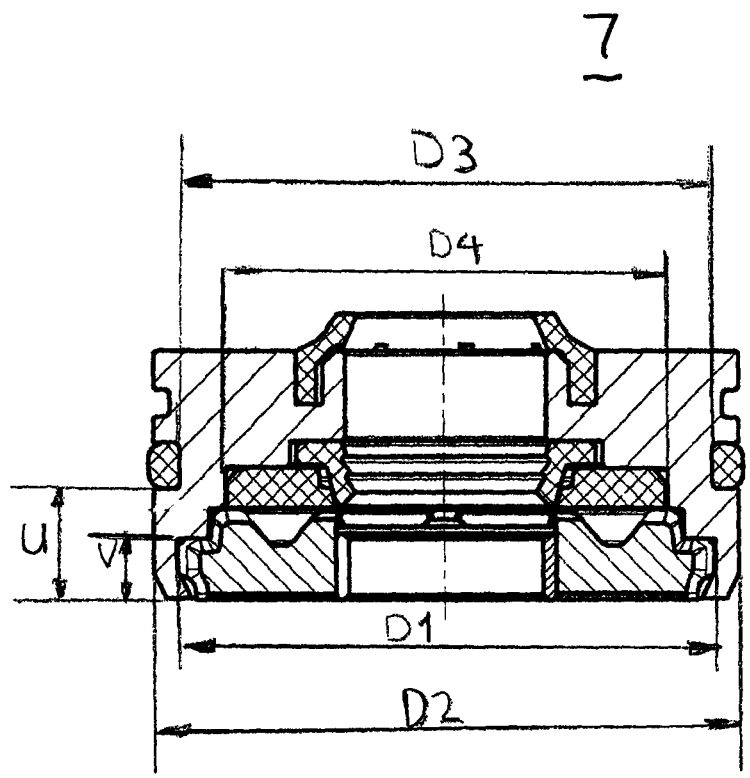
FIG. 3 is a schematic illustration of the closure of the piston-cylinder unit of the mono-tube damper, illustrating preferred dimension ratios of the elements making up the closure.

FIG. 3 is a cutaway view of the closure 7 without showing the piston 16 or the walls of the cylinder (tube) 3. To avoid clutter in the figure, the reference numerals of the elements, which are the same elements shown in FIG. 1, are omitted in FIG. 3. As illustrated in this figure, the ratio of the diameter D1 of the reinforcing element 25 to the inner diameter D2 of the cylinder 3 is highly preferably less than 10:8. Also, the height ratio U to V should be no smaller than 10:8.5, where U is the distance from the bottom of the closure 7 to the bottom of the O-ring groove 13, and where V is the distance from the bottom of the closure 7 to the top of the reinforcing element 25. The ratio of diameters D3 to D4 should be equal to the height ratio U to V, D3 being the diameter between the radial bottom surface of the O-ring groove 13 and D4 being the diameter of the radial outer edges of recess in plug 9 housing the annular rubber ring 20.

Figure 4:
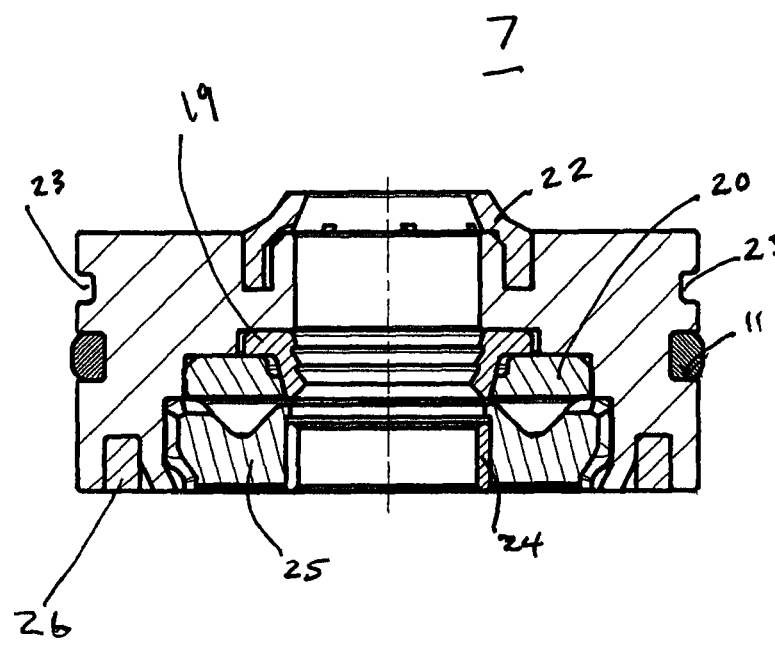
FIG. 4 is a schematic illustration of the closure of the piston-cylinder unit of the mono-tube damper according to a second embodiment.

FIG. 4 shows an alternative embodiment in which the reinforcement of the lower portion of the plug 9 is achieved by provision of a reinforcing ring 26. As shown in the figure, in this embodiment, the reinforcing ring 26 is formed in a lower portion of the plug 9. The reinforcing ring 26 is preferably formed of a material, such as steel, that his harder and more temperature resistant than the material from which the plug 9 is formed, typically aluminum or alloys thereof. In the disclosed alternative embodiment, the provision of the reinforcing ring 26 strengthens the bottom portion of the plug 9, which allows the width of the reinforcing element 25 to be reduced while maintaining the advantageous effect of the present invention. Of course, the plug 9 can also use both the reinforcement method discussed above, such as a hardening process, in addition to the use of the reinforcing ring 26.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A piston-cylinder unit (1) for a mono-tube damper, comprising:
    a cylinder (3) having an inner wall bounding a work space (5) filled with a working medium, the inner wall having one or more impressions (17) formed therein in a radially inward direction;
    a closure (7) fixed axially with respect to the cylinder (3) by positive engagement with the one or more impressions (17), the closure (7) bounding the work space (5) and having a plug (9) sealed with respect to the inner wall by a circumferential seal (11) seated in a sealing groove (13) formed in the plug (9), the plug (9) having an upper portion and a reinforced lower portion: the reinforced lower portion of the plug having a greater resistance to deformation in response to temperature change than the upper portion of the plug and the closure (7) being axially moveable with respect to the cylinder (3) when a temperature threshold is exceeded; and
    a piston rod (16) disposed axially within the cylinder (3) and extending through the closure (7),
    wherein the upper and lower portions of the plug (9) are configured such that an increased pressure of the working medium, caused by the temperature threshold being exceeded, causes an axial movement of the closure such that at least one of the one or more impressions causes greater deformation of the upper portion of the plug (9) than deformation of the lower portion of the plug (9) so as to:
    (i) form a channel in the upper portion of the plug (9), through which the increased pressure, caused by the temperature threshold being exceeded, can escape the piston-cylinder unit, and
    (ii) stop the axial movement of the closure (7) at a point of contact between the reinforced lower portion of the plug (9) and the one or more impressions (17) in the cylinder.

2. The piston-cylinder unit (1) according to claim 1, wherein:
    the plug (9) is made of aluminum or an aluminum alloy, and
    the reinforcement of the lower portion of the plug (9) in relation to the upper portion of the plug (9) is provided by an anodization process.

3. The piston-cylinder unit (1) according to claim 1, wherein:
    the plug (9) is constructed of aluminum or an aluminum alloy, and the reinforcement of the lower portion of the plug (9) in relation to the upper portion of the plug (9) is provided by a pressed-in ring (26) being formed in a bottom portion of the plug (9).

4. The piston-cylinder unit (1) according to claim 1, wherein:
the plug (9) is constructed of aluminum or an aluminum alloy, and
the reinforcement of the lower portion of the plug (9) in relation to the upper portion of the plug (9) is provided by an annular steel reinforcing element (25) provided radially inwardly of a bottom portion of the plug (9).

5. The piston-cylinder unit (1) according to claim 1, wherein:
the plug (9) is constructed of aluminum or an aluminum alloy, and
the reinforcement of the lower portion of the plug (9) in relation to the upper portion of the plug (9) is provided by an anodization process and by an annular steel reinforcing element (25) provided radially inwardly of a bottom portion of the plug (9).

6. The piston-cylinder unit (1) according to claim 1, wherein the reinforced lower portion of the plug extends from the bottom of the plug (9) to a portion of the plug (9) below a lower edge of the sealing groove (13).

7. The piston-cylinder unit (1) according to claim 1, wherein the working medium is hydraulic fluid.

8. The piston-cylinder unit (1) according to claim 1, wherein the closure (7) further comprises an annular sealing element (22) configured to prevent entry of dirt into a space between a top portion of the plug (9) and the piston rod (16).

9. The piston-cylinder unit (1) according to claim 1, wherein the closure (7) further comprises an annular piston rod sealing member (19) disposed around a circumferential surface of the piston rod (16).

10. The piston-cylinder unit (1) according to claim 1, wherein the closure further comprises a guide sleeve (24), surrounding the piston rod (16).

11. The piston-cylinder unit (1) according to claim 10, wherein the guide sleeve (24) comprises Polytetrafluoroethylene (PTFE).

12. The piston-cylinder unit (1) according to claim 1, wherein the one or more impressions (17) are mated to associated indentations (23) in the plug (9), under normal temperature conditions.

13. The piston-cylinder unit (1) according to claim 1, wherein the one or more impressions (17) are mated with portions of a groove (23) formed in the plug (9), under normal temperature conditions.

14. The piston-cylinder unit (1) according to claim 4, wherein the ratio of a diameter D1 of the reinforcing element (25) to the inner diameter D2 of the cylinder (3) is less than 10:8.

15. The piston-cylinder unit (1) according to claim 4, wherein a height ratio U to V, is no smaller than 10:8.5, where U is the distance from the bottom of the closure (7) to the bottom of the sealing groove (13), and where V is the distance from the bottom of the closure (7) to an intermediate portion of the reinforcing element (25).

16. The piston-cylinder unit (1) according to claim 15, wherein a ratio of diameters D3 to D4 is equal to the height ratio U to V, where D3 is the diameter between the radial bottom surface of the sealing groove (13) and D4 is the diameter of the outer edges of a recess in plug (9) housing an annular rubber ring (20) disposed above the reinforcing element (25).

17. The piston-cylinder unit (1) according to claim 4, wherein a distance X from an upper edge of the reinforcing element (25) to an upper edge of the cylinder wall (3), in a condition that the closure (7) is axially displaced by the axial movement of the closure (7), is less than a distance Y between the upper edge of the reinforcing element (25) and the upper edge of the sealing groove (13).

\* \* \* \* \*